US010394235B2

(12) United States Patent
Ceylan et al.

(10) Patent No.: US 10,394,235 B2

(45) Date of Patent: Aug. 27, 2019

(54) DRIVER ASSISTANCE SYSTEM

(71) Applicant: FORD GLOBAL TECHNOLOGIES, LLC, Dearborn, MI (US)

(72) Inventors: Mithat Ceylan, Langenfeld (DE); Tobias Lotz, Nanjing Jiangsu (CN); Jan Lukas Guesten, Cologne (DE); Thomas Michel, Roesrath (DE); Alexander Simukhin, Cologne (DE); Stefan Berg, Erftstadt (DE); Michael John Mould, Leverkusen (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/793,560

(22) Filed: Oct. 25, 2017

(65) Prior Publication Data

US 2018/0113453 A1 Apr. 26, 2018

(30) Foreign Application Priority Data

Oct. 25, 2016 (DE) ........................ 10 2016 220 947

(51) Int. Cl.

| | |
|---|---|
| ***G08G 1/056*** | (2006.01) |
| ***G08G 1/07*** | (2006.01) |
| ***G06K 9/00*** | (2006.01) |
| ***G05D 1/02*** | (2006.01) |
| ***G05D 1/00*** | (2006.01) |
| ***G01C 21/26*** | (2006.01) |

(Continued)

(52) U.S. Cl.

CPC ........... *G05D 1/0055* (2013.01); *G01C 21/26* (2013.01); *G01C 21/3697* (2013.01); *G05D 1/0094* (2013.01); *G05D 1/0246* (2013.01); *G05D 1/0255* (2013.01); *G08G 1/056* (2013.01); *G08G 1/075* (2013.01); *G08G 1/09623* (2013.01); *G06K 9/00818* (2013.01); *G08G 1/166* (2013.01)

(58) Field of Classification Search

None

See application file for complete search history.

(56) References Cited

U.S. PATENT DOCUMENTS

| | | | | |
|---|---|---|---|---|
| 9,208,388 | B2 | 12/2015 | Zobel | |
| 2005/0171694 | A1* | 8/2005 | Schirmer | G01C 21/3626 701/411 |

(Continued)

FOREIGN PATENT DOCUMENTS

| | | | |
|---|---|---|---|
| DE | 10328256 | A1 | 2/2005 |
| DE | 102007048842 | A1 | 9/2008 |

(Continued)

*Primary Examiner* — Navid Ziaeianmehdizadeh

(74) *Attorney, Agent, or Firm* — Brooks Kushman P.C.; Frank Lollo

(57) ABSTRACT

The disclosure relates to a driver assistance system for a motor vehicle. The driver assistance system includes a wrong-way driving detection device that detects underway or imminent wrong-way driving of the motor vehicle. The driver assistance system also includes an output device that outputs a signal to a driver of the motor vehicle indicative of a wrong-way driving detection. The driver assistance system, via the output device, is configured to modify an operating state of the infotainment device according to the wrong-way driving detection.

14 Claims, 1 Drawing Sheet

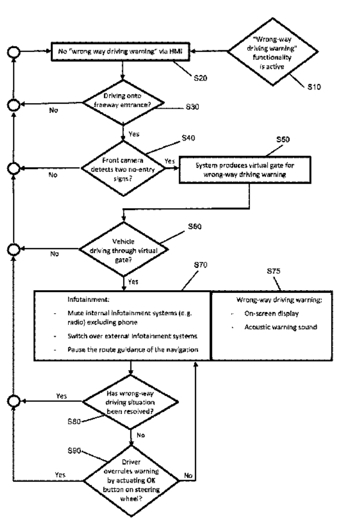

(51) Int. Cl.

| | |
|---|---|
| ***G08G 1/0962*** | (2006.01) |
| ***G01C 21/36*** | (2006.01) |
| *G08G 1/16* | (2006.01) |

(56) References Cited

U.S. PATENT DOCUMENTS

| | | | | | |
|---|---|---|---|---|---|
| 2009/0276153 | A1* | 11/2009 | Lee | G01C 21/28 | 701/414 |
| 2011/0121992 | A1* | 5/2011 | Konaka | B62D 15/029 | 340/905 |
| 2011/0301834 | A1* | 12/2011 | Tao | G01C 21/26 | 701/435 |
| 2012/0136545 | A1 | 5/2012 | Schepp et al. | | |
| 2013/0338850 | A1* | 12/2013 | Takahara | G01C 21/3697 | 701/1 |
| 2013/0342365 | A1* | 12/2013 | Kiefer | B60Q 9/008 | 340/901 |
| 2015/0071496 | A1* | 3/2015 | Jeschke | G06K 9/00818 | 382/104 |
| 2015/0145699 | A1* | 5/2015 | Mielenz | G08G 1/056 | 340/935 |
| 2015/0148987 | A1* | 5/2015 | Jeschke | G01S 1/08 | 701/1 |
| 2015/0256276 | A1* | 9/2015 | Jones | H04H 20/59 | 455/3.01 |
| 2015/0360610 | A1 | 12/2015 | Reed et al. | | |
| 2016/0203716 | A1* | 7/2016 | Jeschke | B60W 40/072 | 701/532 |
| 2016/0210855 | A1* | 7/2016 | Jeschke | G08G 1/04 | |
| 2016/0217688 | A1* | 7/2016 | Jeschke | G06K 9/00798 | |
| 2016/0225256 | A1* | 8/2016 | Hofsaess | G08G 1/056 | |
| 2016/0358466 | A1* | 12/2016 | Youngblood | H04W 4/90 | |
| 2018/0276989 | A1* | 9/2018 | Braeuchle | G08G 1/09623 | |

FOREIGN PATENT DOCUMENTS

| | | | |
|---|---|---|---|
| DE | 102008046875 | B3 | 3/2010 |
| DE | 102012220138 | A1 | 6/2014 |
| DE | 102013209489 | A1 | 11/2014 |
| DE | 102014107403 | A1 | 11/2015 |
| DE | 102014211803 | A1 | 12/2015 |
| EP | 1327968 | A2 | 7/2003 |
| WO | 2010020512 | A1 | 2/2010 |
| WO | 2016020092 | A1 | 2/2016 |

* cited by examiner

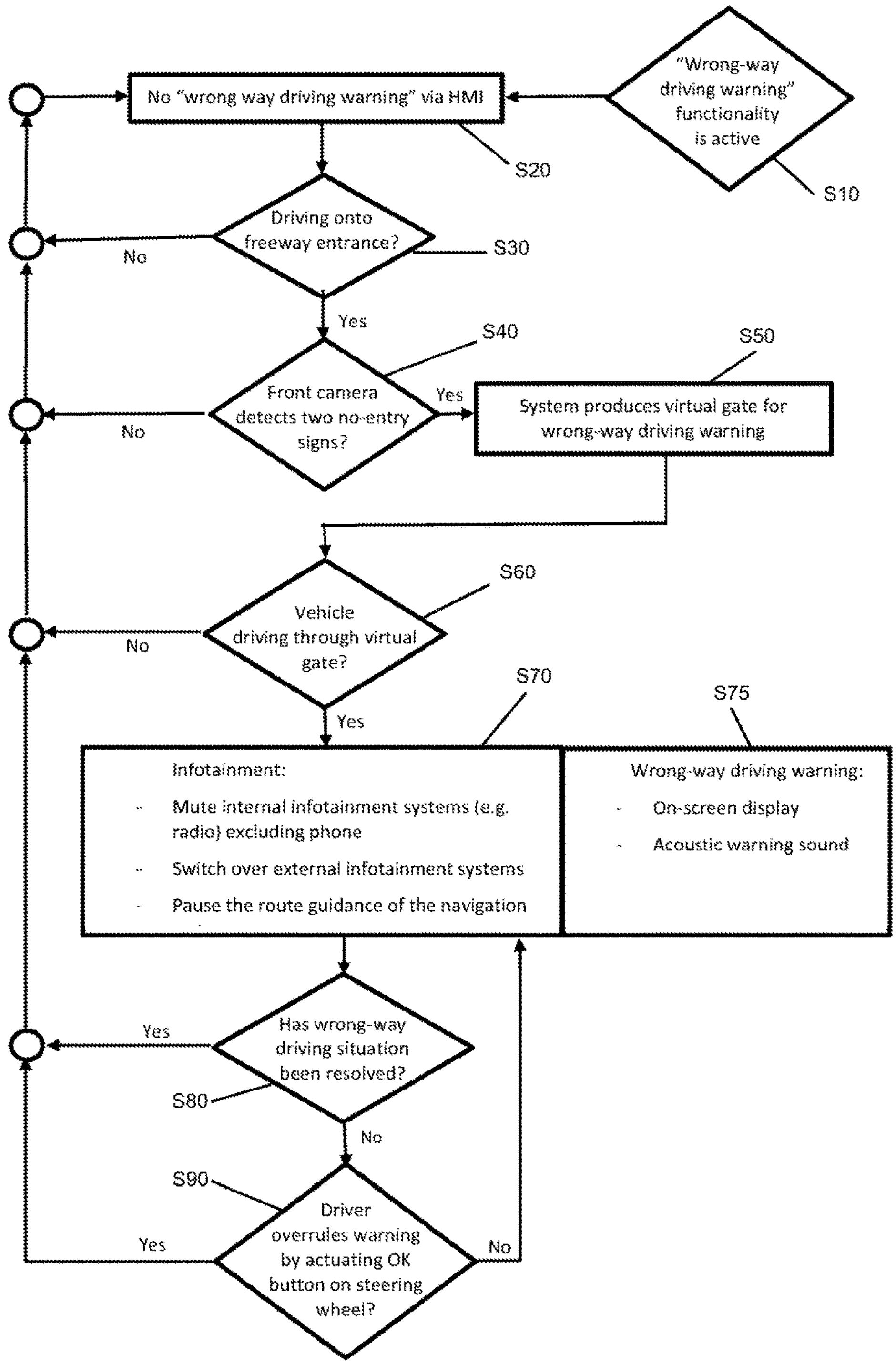
"Wrong-way driving warning" functionality is active
S10
No "wrong way driving warning" via HMI
S20
Driving onto freeway entrance?
S30
No
Yes
S40
Front camera detects two no-entry signs?
No
Yes
S50
System produces virtual gate for wrong-way driving warning
S60
Vehicle driving through virtual gate?
No
Yes
S70
S75
Infotainment:
- Mute internal infotainment systems (e.g. radio) excluding phone
- Switch over external infotainment systems
- Pause the route guidance of the navigation
Wrong-way driving warning:
- On-screen display
- Acoustic warning sound
Has wrong-way driving situation been resolved?
Yes
S80
No
S90
Driver overrules warning by actuating OK button on steering wheel?
Yes
No

DRIVER ASSISTANCE SYSTEM

CROSS-REFERENCE TO RELATED APPLICATIONS

This application claims foreign priority benefits under 35 U.S.C. § 119(a)-(d) to DE Application 10 2016 220 947.7 filed Oct. 25, 2016, which is hereby incorporated by reference in its entirety.

TECHNICAL FIELD

The disclosure relates to a driver assistance system.

BACKGROUND

Known functionalities of driver assistance systems that assist a driver of a motor vehicle include, in particular, warning of existing or imminent wrong-way driving of the motor vehicle. In this context, the driver is warned, for instance, if driving onto a freeway in an opposite direction from the specified driving direction. In order to detect any no-entry signs, it is standard practice in a driver assistance system equipped with this functionality to analyze, continuously, images supplied by the camera provided in the top region of the windshield. The navigation system simultaneously supplies necessary information about a current position of the motor vehicle. On detecting wrong-way driving, a distinctive acoustic warning sound, for example, can be output in conjunction with a suitable prompt on a display or in the instrument panel to check the driving direction.

WO 2016/020092 A1 discloses a method for controlling a motor vehicle in order to prevent wrong-way driving, in which the motor vehicle is brought into a safe condition if the driver fails to react in a suitable way to prevent or stop driving the wrong way.

US 2015/0360610 A1 discloses systems and methods for improving in-vehicle detection of wrong-way driving, in which, by modifying a confidence level, the system sensitivity can be changed by moving the cutoff point at which an alert activation takes place. At a greater confidence level or system sensitivity, the system may also be allowed to take further actions beyond a simple warning, for instance actions such as throttle limiting, turning on the hazard lights or even bringing the vehicle to a stop.

With regard to the further prior art, reference is made purely by way of example to DE 102008041295A1, DE 102009048323A1, DE 102013209489A1, DE 102014211803A1, DE 102010052129A1, DE 102007048842 A1 and EP 1327968A2.

A problem that arises in practice is that in the event of the driver being distracted or even confused by the information communicated to him during driving, there is a risk of the driver not noticing the relevant warning signals, warning of wrong-way driving, or only noticing these signals after a delay, with the result that, in the worst case, accidents may occur despite the intended functionality for warning of wrong-way driving. Thus, for instance, in one example scenario, a navigation system present in the motor vehicle may continue to output route-guidance information, which can distract the driver from a wrong-way driving warning being made at the same time.

Sometimes situations can even arise in which information or recommendations from the navigation system contradict a wrong-way driving warning being made at the same time, thereby confusing the driver. An example of such a situation exists, for instance, when the route guidance from the navigation system outputs the voice response "continue straight on for 5 miles" at the same time as a wrong-way driving warning is displayed.

Bearing the above in mind, an object of the present disclosure is to provide a driver assistance system that allows the driver to be warned more efficiently of already underway or imminent wrong-way driving while avoiding the problems described above.

SUMMARY

A driver assistance system according to the disclosure for a motor vehicle comprises a wrong-way driving detection device that detects underway or imminent wrong-way driving of the motor vehicle, and comprises an output device that outputs a signal to a driver of the motor vehicle according to this wrong-way driving detection, is configured to modify an operating state of at least one further information or infotainment device according to said wrong-way driving detection.

In particular, the disclosure is based on the idea of a driver assistance system having functionality to warn of wrong-way driving being designed in such a way that a current status of this functionality is communicated to other systems (e.g. to a navigation system or infotainment system), with the result that mutually inconsistent or possibly contradictory information communications to the driver can be avoided.

Thus, for example, route guidance currently being given by the navigation system can be stopped in the event of an active wrong-way driving warning. Additionally or alternatively, infotainment systems (e.g. radio) can be muted. If applicable, said muting can exclude certain functionalities such as a phone or hands-free function, for example, it being possible in the latter case to ensure that the driver can still be contacted. Functionalities deactivated or stopped by the driver assistance system when a wrong-way driving warning is present may include also the connection to external infotainment systems, in which case for such systems, for instance, a screen may be switched off or the function may be switched over to an in-vehicle HMI ("Human-Machine Interface").

According to one embodiment, modification of an operation of the information or infotainment device involves muting or deactivating the information or infotainment device, or temporarily pausing an information output by the information or infotainment device.

According to one embodiment, the driver assistance system is configured to reset the information or infotainment device into the operating state prior to the modification, once a wrong-way driving detection has ended. Hence after the wrong-way driving warning is deactivated, the systems affected by the aforementioned switch-off or interruption can automatically return to their original state that existed prior to the modification according to the disclosure (in which case, for instance, the navigation system can resume output of route-guidance instructions and relevant on-screen displays can be reactivated).

According to one embodiment, the driver assistance system is configured to stop, in response to a driver input, the output of a signal to the driver, which output is dependent on the wrong-way driving detection, and/or the modification of the operating state of the information or infotainment device.

According to one embodiment, the driver assistance system is configured to switch over an operating state of at least one external infotainment system connected to the motor vehicle.

According to one embodiment, the driver assistance system is configured to maintain an operational readiness of a phone connected to the motor vehicle irrespective of the wrong-way driving detection.

According to one embodiment, the at least one information or infotainment device comprises a navigation system.

According to one embodiment, the at least one information or infotainment device comprises an audio source.

The disclosure is described in greater detail below using an exemplary embodiment with reference to the accompanying drawing, in which:

BRIEF DESCRIPTION OF THE DRAWINGS

FIG. 1 shows a flow diagram intended to explain an example of operation of a driver assistance system according to the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

An example scenario is used below to explain, with reference to the flow diagram shown in FIG. 1, an example of operation of a driver assistance system according to the disclosure.

As shown in FIG. 1, a starting point is that a wrong-way driving warning functionality is active in step S10, with initially, as given by step S20, no wrong-way driving warning being output in the relevant Human-Machine Interface (HMI).

In step S30, an automatic check of whether the vehicle is driving on a freeway entrance is performed. If the vehicle is not driving on a freeway entrance, the flow diagram returns to step S20. If driving on a freeway entrance is established on the basis of the query in step S30, in step S40 a query is made as to whether a front camera detects two no-entry signs. If the front camera does not detect two no-entry signs, the flow diagram returns to step S20.

If, however, according to the query in step S40, two no-entry signs are detected, the driver assistance system produces, in step S50, a virtual gate for a wrong-way driving warning. In step S60, a query is made as to whether the vehicle is driving through the virtual gate for a wrong-way driving warning. If the vehicle is not driving through the virtual gate for a wrong-way driving warning, the flow returns to step S20.

If, according to the query in step S60, the vehicle is driving through the virtual gate for the wrong-way driving warning, in step S70 an operation of at least one information or infotainment system is modified, for example pausing, interrupting or muting certain systems such as, for instance, pausing the route guidance from the navigation system, muting infotainment systems such as e.g. radio (if applicable, excluding the phone) and, if applicable, switching over external infotainment systems (such as e.g. "Apple CarPlay") connected to the in-vehicle multimedia system to an operating mode as the vehicle HMI.

Simultaneously, as given by step S75, a wrong-way driving warning is output by on-screen display and/or as an acoustic warning sound, so that the driver is prompted to check the driving direction.

After the wrong-way driving warning is output, a check is performed in step S80 as to whether the wrong-way driving situation still exists. If the wrong-way driving situation has resolved itself, for instance because the driver has left the road or changed the driving direction, and the vehicle is moving again correctly, and hence detection of wrong-way driving has ended, the flow diagram returns to step S20. The information or infotainment device is thereby reset into the operating state before the modification to the at least one information or infotainment system.

If the vehicle continues to be in a wrong-way driving situation, the driver has an option to overrule the warning by a suitable input (e.g. actuating an OK button on the steering wheel). If, according to the query in step S90, the driver overrules the warning by actuating an OK button on the steering wheel, the flow diagram returns to step S20. If, according to the query in step S90, the driver does not overrule the warning e.g. by actuating the OK button on the steering wheel, the steps S70 and S75 continue to be performed (i.e. muting or pausing the infotainment systems or of the navigation system and output of the wrong-way driving warning).

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A driver assistance system for a vehicle, comprising:

a wrong-way driving detection device having a camera and configured to detect upcoming wrong-way driving or wrong-way-driving underway; and an output device, coupled with an infotainment device, that outputs a signal according to data from the wrong-way driving detection device, wherein the output device is configured to modify an operating state of the infotainment device according to the signal based on the data from the wrong-way driving detection device;

wherein the output device is further configured to stop, in response to a driver input while the operating state of the infotainment device is modified according to data from the wrong-way driving detection device, (i) output of a wrong way driving detection warning signal to the driver that is dependent on the wrong-way driving detection, and (ii) modification of the operating state of the infotainment device.

2. The driver assistance system as claimed in claim 1, wherein the output device modifies the operation of the infotainment device such that the output device mutes or deactivates the infotainment device, or temporarily pauses information output by the infotainment device.

3. The driver assistance system as claimed in claim 1, wherein the output device is further configured to reset the infotainment device into the operating state prior to the modification, once a wrong-way driving detection has ended.

4. The driver assistance system as claimed in claim 1, wherein the output device is further configured to switchover a further operating state of an external infotainment system connected to the infotainment device.

5. The driver assistance system as claimed in claim 1, wherein the output device is configured to maintain an operational readiness of a phone connected to the infotainment device without muting the phone and irrespective of wrong-way driving detection.

6. The driver assistance system as claimed in claim 1, wherein the infotainment device includes a navigation system, and wherein the output device is configured to modify the operating state of the infotainment device according to the signal by pausing a route guidance from the navigation system.

7. The driver assistance system as claimed in claim 1, wherein the infotainment device includes a radio, and wherein the output device is configured to modify the operating state of the infotainment device according to the signal by muting the radio.

8. The driver assistance system as claimed in claim 1 wherein the wrong-way driving detection device is configured to detect upcoming wrong-way driving in response to the camera detecting at least one no-entry sign.

9. The driver assistance system as claimed in claim 8 wherein the wrong-way driving detection device is configured to detect wrong-way-driving underway in response to the vehicle driving through a virtual gate produced after detection of upcoming wrong-way driving.

10. A vehicle comprising:

a wrong-way driving detection device having a camera and configured to detect upcoming wrong-way driving or wrong-way-driving underway;

an infotainment system internal to the vehicle that outputs a signal based on data from the wrong-way device, and is configured to modify an infotainment operating state according to the signal; and an external infotainment system coupled with the infotainment system, wherein the infotainment system is further configured to switchover and modify an external infotainment operating state according to the signal;

wherein the wrong-way device is further configured to, in response to a driver input while the operating state of the infotainment system is being modified according to data from the wrong-way driving detection device, stop output of the signal to stop (i) output of a wrong way driving detection warning signal to the driver that is dependent on the wrong-way driving detection, and (ii) modification of the operating state of the infotainment system.

11. The vehicle as claimed in claim 10, wherein the infotainment system modifies the operation of the external infotainment system such that the infotainment system mutes or deactivates the external infotainment system.

12. The vehicle as claimed in claim 10, wherein the wrong-way device is configured to reset the infotainment system into a prior operating state once the signal is not detected.

13. The vehicle as claimed in claim 10, wherein the infotainment system is configured to maintain an operational readiness of a phone connected as the external infotainment system irrespective of wrong-way driving detection.

14. The vehicle as claimed in claim 10, wherein the infotainment system modifies the operation of the external infotainment system such that the infotainment system temporarily pauses information output by the external infotainment system.

* * * * *